June 13, 1933.   E. J. W. RAGSDALE   1,914,344

SHEET METAL JOINT CONSTRUCTION

Filed Feb. 14, 1930

INVENTOR.
EARL J. W. RAGSDALE
BY
ATTORNEY.

Patented June 13, 1933

1,914,344

UNITED STATES PATENT OFFICE

EARL J. W. RAGSDALE, OF NORRISTOWN, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

SHEET METAL JOINT CONSTRUCTION

Application filed February 14, 1930. Serial No. 428,302.

My invention relates to a sheet metal joint construction, the invention having particular reference to joint constructions suitable for stuctural truss work, such as is common in aircraft construction.

It is a main object of my invention to provide a joint construction of this kind which can be readily assembled, which is adaptable to a variety of conditions, which can be made at low cost, which is very strong and durable, and which combines all these characteristics with extremely light weight.

I attain this object in large part by utilizing in the construction of the joint and the parts entering into it a light gauge rustless alloy steel of high physical characteristics, giving it very small weight for its strength, and by electrically spot welding the parts together in the assembly. Spot welding is probably the fastest known process of joining parts together by individual separated fastenings. It is probably also the cheapest known way of making the joints of structures having sections of widely varying form at the joints. The joint made by spot welding is also a weightless joint and is made without cutting into and weakening the metal at the joint.

The form of the members entering into the joint and the manner in which they are assembled enables me to use this efficient form of joinder to very good advantage.

Generally, the invention consists in a joint construction such as is particularly applicable to the construction of airplane fuselages or other like closed truss structures. It may comprise a main member, such as the longéron of an airplane fuselage which is built up of inner and outer members to form a hollow closed structure, the outer member being of hollow open section facing inwardly and flanged at its edges and adapted to receive an angle gusset with the apex thereof in the hollow of said member and its sides secured to said edge flanges, and said outer member being further adapted to receive a flanged closing member between its flanged side walls secured to the said flanges and the gusset to form a closed tubular structure. The gusset is provided with reinforcing plates extending between its side walls and rigidly secured thereto and the side walls of the gusset and these reinforcing plates form a wide area for the securement of the auxiliary transverse and diagonal truss members.

The truss members are conveniently formed of hollow open sided tubular section having lateral flanges at their open side and are reinforced at their ends by flattening the sides, but leaving a space therebetween to receive the gusset wall or its reinforcing plate, to which the truss members may be strongly secured by spot welding. Instead of flattening the entire end, part may be left to provide ribbing between the flattened portions.

The auxiliary trussing may be closed by an additional member bridging the open side of the main member, in a manner similar to the main member or chord.

One form of the detailed construction by which the objects and advantages of my invention are achieved is illustrated in the accompanying drawing, in which Fig. 1 is a perspective view, as viewed from the outside, of a joint construction according to the invention.

Figure 1:
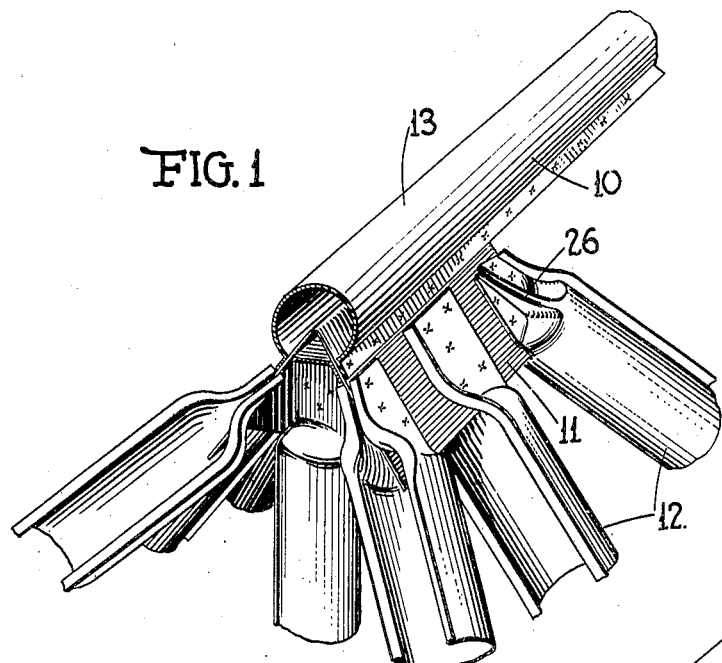

Referring to the drawing, the numeral 10 indicates a hollow longitudinal frame member or chord, such as the longéron of an airplane fuselage, 11 indicates the angular gusset member secured thereto, and 12 indicate auxiliary truss members secured to the main member 10 of the joint through the gusset. The number and the direction in which these auxiliary transverse and diagonal truss members extend, will, of course, vary with the type of trussed structure in which the joint is used, the nature of the stresses to which it is subject, and the transverse sectional and longitudinal contour of the trussed structure.

According to my invention, I may form the main or chord member 10 of an outer hollow section member 13 of tubular cross section open on its inner side and provided with outwardly extending edge flanges 14 and 15, and an inner substantially flat member 16 having corresponding edge flanges 17 and 18 adapted to overlap and be secured to the edge flanges 14 and 15, as by spot welding, to form a closed hollow structure.

Figure 2:
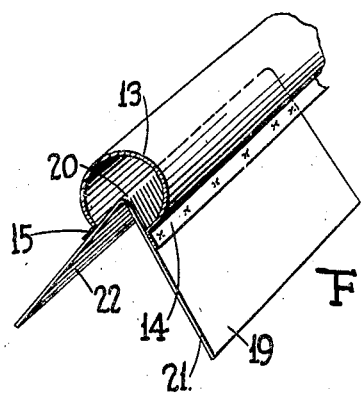
Fig. 2 is a similar view showing main longitudinal open sided inwardly facing member with the gusset assembled therewith.

Prior to the application of the inner member 16, I secured to the outer member 13, an angle section gusset member 19 having its apex 20 extending into the hollow member and its side walls 21, 22 overlapping and rigidly secured, as by spot welding to the edge flanges 14 and 15 of the member 13, as shown in Fig. 2.

Figure 4:
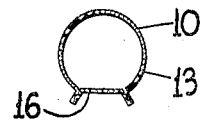
Fig. 4 is a cross sectional view of the main member outside the location of the gusset.
Figure 3:
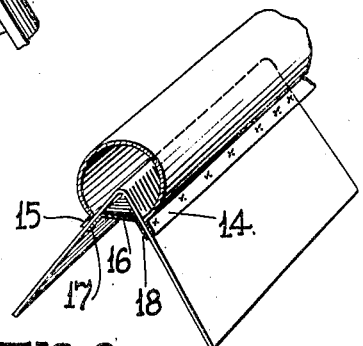
Fig. 3 is a similar view of the complete closed main member and gusset assembly.

As shown by comparison of Figs. 3 and 4, the closure member 16 is offset at the joint to fit inside and be secured to the combined thickness of the angle gusset 19 and the edge flanges 14 and 15 of the member 13.

The side walls 21 and 22 of the gusset member 19 are rigidly interbraced by spaced plate members 23, extending transversely between the side walls and having edge flanges 24, through which they are secured, as by spot welding, to the side walls 21 and 22.

So informed, the reinforced gusset provides extensive surfaces for the anchorage of the auxiliary truss members 12 since not only do the side walls 21, 22 provide such surfaces, but the transverse interbracing members 23 as well.

Figure 6:
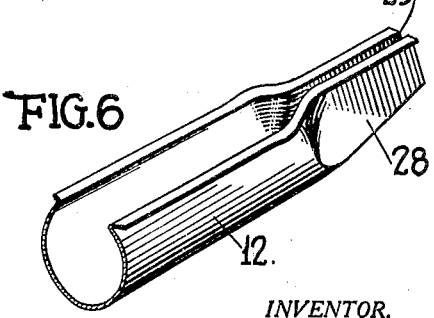
Fig. 6 is a perspective view of an end portion of an auxiliary truss member adapted to enter into my joint.
Figure 5:
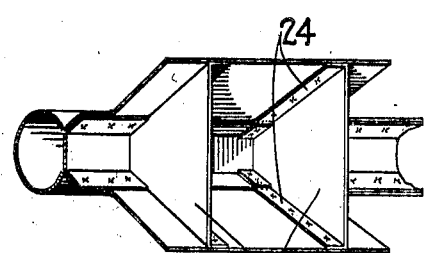
Fig. 5 is an inside view of the main member and gusset assembly showing the transverse reinforcing members in place.

In Fig. 1, I have shown a number of auxiliary members 12 secured to the gusset member, but since all of them are adapted to be secured in the same way, and are of similar form, I will describe the formation and attachment of a typical such member such as is shown in Fig. 6.

An auxiliary truss 12 may comprise, as a main element thereof, an open sided tubular member, flanged at its edges in a manner similar to the member 13, and while I have herein shown no closing member associated with the tubular member, it may be made a closed section truss by the addition of such a member, as member 16, associated with member 13 to form the closed section chord.

At its end where it is secured to the reinforced gusset 21, 22, 23 the opposite side walls are flattened as shown at 25, and spaced from each other a distance equal to the thickness of the gusset walls.

An alternative manner of forming the ends of the auxiliary braces or truss members 12 is that shown at the top of Fig. 1, in which the end of the member is shown flattened only on opposite sides of a central plane passing through its axis thereby leaving a central rib 26, which adds additional strength and stiffness to the end of the member. The flattened portions on the opposite sides of the rib are secured, as by spot welding, to the gusset 11.

It will be seen that by this construction I have provided an exceedingly simple, strong and adaptable joint construction and one which is very light, and hence well adapted for aircraft work.

While I have herein described a specific embodiment of my invention, it will be understood that changes and modifications may be made without separating from the spirit and scope of the invention, and such changes and modifications are intended to be covered in the following claims.

What I claim is:

1. A joint construction comprising an inwardly facing open hollow member having outwardly turned edge flanges, an angular gusset member having its apex within the hollow of said member and its sides secured to said edge flanges and extended beyond said flanges, and a member closing said first-named member and secured against the inner face of the side walls of said angular gusset and spaced outwardly from the apex thereof to form a second gusset box section at the gusset point.

2. A joint construction comprising an inwardly facing open hollow member having outwardly turned edge flanges, an angular gusset member having its apex extending into the hollow of said member, and its side walls secured to and extended beyond said edge flanges and a member extending between the sides of said gusset in a plane transverse to both the said hollow member and the side walls of the gusset, and having edge flanges secured to both said side walls.

3. A joint construction comprising an inwardly facing open hollow member having outwardly turned edge flanges, an angular gusset having its apex extending into the hollow of said member and its side walls secured to and extended beyond said flanges, and a closing member having edge flanges secured to the edge flanges of said hollow member and to the inside face of the side walls of said gusset, and a transverse plate having flanged edges extending between said side walls of the gusset and secured to said walls through their flanged edges.

In testimony whereof I hereunto affix my signature.

EARL J. W. RAGSDALE.